United States Patent Office 3,444,054
Patented May 13, 1969

3,444,054
EVAPORATOR SALINE FEED WATER TREATMENT
FOR SCALE CONTROL
Murrell L. Salutsky, Highland Park, Ill., assignor to W. R. Grace & Co., New York, N.Y., a corporation of Connecticut
No Drawing. Filed Nov. 23, 1966, Ser. No. 596,405
Int. Cl. C23f 14/02; B01d 1/00
U.S. Cl. 203—7                              9 Claims

ABSTRACT OF THE DISCLOSURE

Process for evaporating saline water comprising maintaining a scale-inhibiting water-soluble salt of a methacrylic acid polymer in the said water, and evaporating the said water.

---

This invention relates to a process for preventing the formation of adherent deposits and scales on the heating surfaces of saline water evaporators. In particular, this invention relates to a process for treating saline evaporator waters with polymethacrylic acid or water-soluble salts thereof.

In summary, the process of this invention is a method for evaporating saline waters such as sea water, brines, and brackish waters comprising maintaining in the saline water from 0.1 to 20 p.p.m. of a scale inhibiting polymer selected from the group consisting of polymethacrylic acid and alkali metal salts thereof having an average molecular weight of from 1000 to 500,000, calculated as sodium polymethacrylic, and evaporating the saline water at a temperature of from 85° F. up to 350° F.

Evaporation of sea water and other naturally occurring saline waters gives rise to the formation of scale deposits of low thermal conductivity on the heat transfer surfaces of the distillation plant. The heat transfer coefficients are thereby reduced, leading to deterioration of plant performance and necessitating the eventual shut down of the plant for cleaning. Although several methods are in use for the control of alkaline scales, calcium sulfate and other scaling constituents normally found in saline waters, scaling considerations still set an upper limit on the brine boiling temperature and concentration factor, and hence on plant performance. In evaporators, scale may be formed whenever scale-forming compounds are present in the feed water, but the type and composition of the scale may vary. For example, when evaporation of sea water takes place under reduced pressure at boiling temperatures below 148° F., the principal scaling phase is calcium carbonate; at higher temperatures it is primarily magnesium hydroxide in the form of brucite, but calcium sulfate scales may be formed at all temperatures if the brine concentration is sufficiently high.

At the present time the principal treatment to prevent scale in saline water evaporators employs "Hagevap LP," a mixture of sodium polyphosphates, lignin sulfonic acid derivatives and various esters of polyalkylene glycols, whose functions are sequestering, dispersing, foam inhibiting, and the like. This material, however, is only effective up to 195° F. because the polyphosphates rapidly hydrolyze to form a sticky orthophosphate deposit at higher temperatures.

Higher distilling temperatures provides cost reductions, but in order to obtain them, continuous injection of from 100 to 120 p.p.m. of sulfuric acid to remove bicarbonate and carbonate alkalinity present in natural sea water is currently necesary. This procedure prevents calcium carbonate and magnesium hydroxide scales. At temperatures above around 250° F., however, formation of calcium sulfate scales is increased by sulfuric acid treatment.

Also, the logistics and handling of wet acid is a problem in remote areas, and the potential of accidents to personnel and equipment requires safeguards which again raise the cost of the treatment. Ships will not carry wet acids under any circumstances, and their evaporators are thus limited to the performance available at 195° F.

A high temperatures type treatment has been sought by sea water water distillation interests for many years but no adequate treatment had been developed prior to this invention. A variety of materials have been proposed for use as treating agents in the saline evaporator waters. The use of graft polymers having a variety of groups on a starch type base were described in British Patent 919,450. Trials of low molecular weight polyacrylic acid have been disclosed in British Patent No. 1,034,680. However, no effective high temperature chemical evaporator water treatment has been found prior to this invention.

Processes which have been used in treating fresh water boiler feeds have not generally proven applicable to solve problems arising in saline water evaporators. This is partially due to the widely different relative concentrations of scale forming materials in fresh water as contrasted to saline waters such as sea water, brines, and brackish waters. In fresh water boiler treatment, sodium phosphates are added, principally to precipitate calicum from the fresh water as alkaline calcium phosphate, commonly known as hydroxyapatite. This calcium phosphate is generally a finely divided material which has considerably less tendency to form objectionable deposits than have the calcium compounds that otherwise would be present in the boiler water. Sodium carbonate, usually together with sodium hydroxide, is added to the fresh water boiler feed to promote a desired alkalinity in the water to precipitate magnesium as magnesium hydroxide and to inhibit formation of sticky magnesium phosphate scale. It also retards the formation of silica scale. The use of these chemical treatment agents raises scale forming problems which are peculiar to fresh water boiler systems. The use of polyacrylates in the boiler water to reduce the stickiness of the calcium phosphate sludge and to fluidize the sludge in the boiler was disclosed in Patent 2,783,200. Since no supplementary treatment with condensed phosphates is necessary with the process of this invention, calcium phosphate precipitates are not formed, and no fluidization of calcium phosphate sludges is required.

It is the object of this invention to provide a process for treating saline evaporator waters to prevent scale formation on the heat transfer surfaces thereof. It is a further object of this invention to provide a method for preventing scaling in saline water evaporators by a process which permits higher operating temperatures and makes unnecessary the use of wet acid treatments.

In the process of this invention, from 0.1 to 20 p.p.m. and preferably from 1 to 3 p.p.m., calculated as sodium polymethacrylate, of polymethacrylic acid or alkali metal salts thereof are maintained in the evaporator water. The term "polymethacrylates" is used to denote both polymethacrylic acid and the respective salts. The process of this invention is suitable for treating all saline evaporator systems. Examples of evaporator systems which can be treated by the process of this invention include flash evaporators—including once-through evaporators, and recycle evaporators such as the single effect multistage and multieffect multistage evaporators—and boiling evaporators such as single effect evaporators, multieffect evaporators, falling film evaporators, rising film evaporators, wiped film evaporators, and submerged tube or basket evaporators, all of which are well known in the art. In the process of this invention, the polymethacrylates can be added at any place in the system. The polymethacrylates can be added to the raw water feed, the non-boiling heating zones where sensible heat is added, the vaporization zones where latent heat is transferred, or recycle streams.

The saline water evaporator systems which can be treated by the process of this invention can use a wide variety of feeds. The process of this invention is suitable for evaporating saline waters such as sea water, brines and brackish waters having a hardness greater than 50 p.p.m., calculated as calcium carbonate, and sewage effluents.

The polymethacrylates used in the process of this invention include polymethacrylic acid and water soluble salts thereof having a molecular weight of from 1000 to 500,000 and preferably having an average molecular weight of from 1,000 to 100,000, calculated as sodium polymethacrylate. The preferred polymethacrylic acid salts are the alkali metal salts. The polymethacrylic acid or salts thereof are added to the evaporator system as an aqueous solution, for example containing at least one weight percent of the polymeric agent. The aqueous solution can also contain other treatment agents such as anti-foam agents, corrosion inhibitors, oxygen scavengers, and the like if they are compatible with and do not cause precipitation of the polymer.

With the process of this invention, continuous vaporization at temperatures up to 350° F. can be obtained, and excellent results at temperatures up to 260° F. are observed with minimal deposits.

The process of this invention is further illustrated by the following specific but non-limiting examples.

EXAMPLE 1

This example shows the results obtained by treating saline evaporator waters with polyacrylic acid.

A bench scale, once-through evaporator was operated for 100 hours using a coastal sea water feed having the following analysis:

| | P.p.m. |
|---|---|
| Chlorides | 15,700 |
| $Mg^{++}$ | 1,075 |
| $Ca^{++}$ | 329 |
| $HCO_3^-$ | 110 |
| $CO_3^=$ | 11 |

Total dissolved solids, 3.08 wt. percent.

The feed was deaerated, treated with sufficient polyacrylic acid to maintain a polyacrylic acid concentration of 2 p.p.m. in the evaporator water, heated to 240° F. under pressure, and flashed. The heat transfer coefficients for the heating tube were initially 300 B.t.u./(hr.) (sq. ft.) (° F.), but after 50 hours of operation, the heat transfer rate declined to 250 B.t.u./(hr.) (sq. ft.) (° F.) and leveled out at this rate. At the end of the test run, the inner wall of the heating tube was examined and found to have a polyacrylate film coating.

EXAMPLE 2

This example shows the superior results obtained by treating saline evaporator waters with a polymethacrylate.

A 60 ton per day rated capacity two-stage flash evaporator was operated for 15 days during a cruise through the Caribbean and down the west coast of South America. The ocean water used as the feed varied from mid-ocean sea water to more dilute coastal waters containing large amounts of organic pollutants. The feed water, pretreated with 1.5 p.p.m. of polymethacrylic acid, was heated to 190° F., the maximum temperature obtainable with the flash evaporator equipment used, and was then flashed. The rate of distillate vapor production gradually increased and ultimately was 130 percent of the design capacity of the evaporator. Operation at temperatures above 190° F. was not possible because the vapor screening system, which removes spray droplets from the distillate vapor, could not handle the large increase in vapor production effected by the higher temperatures. The distillate vapor production remained at 130 percent during the remainder of the test at 190° F.

Examination of the main heater tube outlet ends and the tube sheet showed it to be clean and bright. From this examination, it was concluded the polymethacrylic acid not only prevented scale formation in the tubes but also removed therefrom residual scale present on the tubes before the test. In contrast to polyacrylic acid, no evidence of a polymethacrylate coating on the heat exchange surfaces was observed.

Obviously, many modifications and variations of the invention as hereinabove set forth can be made without departing from the essence and scope thereof, and only such limitations should be applied as are indicated in the claims.

I claim:

1. A process for evaporating saline water comprising maintaining in the said water from 0.1 to 20 p.p.m. of a scale inhibiting agent consisting essentially of a water-soluble alkali metal salt of a methacrylic acid polymer having an average molecular weight of from 1000 to 500,000, calculated as sodium polymethylacrylate, and evaporating the said water at a temperature of from 85° F. to 350° F.

2. The process of claim 1 wherein the polymer is added to evaporator feed water.

3. The process of claim 1 wherein the polymer is introduced in an evaporator non-boiling heating zone.

4. The process of claim 1 wherein the polymer is added in an evaporator vaporization zone.

5. The process of claim 1 wherein the polymer is added to an evaporator recycle stream.

6. The process of claim 1 wherein the sea water is evaporated at a temperature up to 260° F.

7. The process of claim 1 wherein the saline water is sea water.

8. The process of claim 7 wherein the polymer salt is the sodium salt.

9. The process of claim 8 wherein the polymer has an average molecular weight of from 1,000 to 100,000, calculated as sodium polymethacrylate.

References Cited

UNITED STATES PATENTS

| 3,260,668 | 7/1966 | McIlhenny | 203—7 X |
| 3,293,152 | 12/1966 | Herbert et al. | 203—7 |

OTHER REFERENCES

International Symposium on Water Desalination, Oct. 3–9, 1965, Washington, D.C.

L. S. Herbert, P. F. Rolfe and U. J. Sterns, Australia, pp. A, 1, 2, 4, 5, 10, 11.

NORMAN YUDKOFF, *Primary Examiner.*

J. SOFER, *Assistant Examiner.*

U.S. Cl. X.R.

203—10